(12) United States Patent
Booij et al.

(10) Patent No.: US 12,058,590 B2
(45) Date of Patent: Aug. 6, 2024

(54) LOCATION DETERMINATION SYSTEM HAVING MESH INFRASTRUCTURE TO REDUCE POWER CONSUMPTION

(71) Applicant: Sonitor Technologies AS, Oslo (NO)

(72) Inventors: Wilfred Edwin Booij, Oslo (NO); Endre Bakka, Oslo (NO)

(73) Assignee: Sonitor Technologies AS, Oslo (NO)

( * ) Notice: Subject to any disclaimer, the term of this patent is extended or adjusted under 35 U.S.C. 154(b) by 0 days.

(21) Appl. No.: 18/103,624

(22) Filed: Jan. 31, 2023

(65) Prior Publication Data

US 2023/0319523 A1    Oct. 5, 2023

Related U.S. Application Data

(63) Continuation of application No. 16/958,449, filed as application No. PCT/IB2018/060662 on Dec. 27,
(Continued)

(51) Int. Cl.
| | |
|---|---|
| *H04W 4/30* | (2018.01) |
| *G01S 1/72* | (2006.01) |
| *G01S 1/74* | (2006.01) |
| *G01S 1/76* | (2006.01) |
| *G01S 5/00* | (2006.01) |
| *G01S 5/18* | (2006.01) |

(Continued)

(52) U.S. Cl.
CPC ............. *H04W 4/30* (2018.02); *G01S 1/725* (2013.01); *G01S 1/751* (2019.08); *G01S 1/76* (2013.01);
(Continued)

(58) Field of Classification Search
CPC ......... H04W 4/30; H04W 4/80; H04W 84/18; H04B 11/00; G01S 1/725; G01S 1/751;
(Continued)

(56) References Cited

U.S. PATENT DOCUMENTS

| | | | |
|---|---|---|---|
| 10,126,407 B1 * | 11/2018 | Amir | G01S 5/02585 |
| 11,570,592 B2 | 1/2023 | Booij et al. | |

(Continued)

FOREIGN PATENT DOCUMENTS

| | | |
|---|---|---|
| CN | 102752845 A | 10/2012 |
| CN | 103503529 A | 1/2014 |

(Continued)

OTHER PUBLICATIONS

International Search Report dated Apr. 12, 2019 for Appl. No. PCT/IB2018/060662, 7 pages.

(Continued)

*Primary Examiner* — Michael Y Mapa
(74) *Attorney, Agent, or Firm* — Sterne, Kessler, Goldstein & Fox P.L.L.C.

(57) ABSTRACT

The present disclosure relates to a location determination system that includes acoustic transmitting devices, location tags, and a wireless mesh network, where the wireless mesh network uses battery-powered devices. A location tag receives acoustic signals (e.g., ultrasound signals) from an acoustic transmitting device. Clocks from members of the wireless mesh network are synchronized by observation of clock pairings, each clock pair formed by respective clocks in a transmitting device that transmits a message and a receiving device that receives the message. By analyzing the observed clock pairings, a best fit between the clock pairings may be determined. After selecting a reference clock, an acoustic transmission schedule may be propagated to the respective acoustic transmitting device.

20 Claims, 4 Drawing Sheets

Related U.S. Application Data 2018, now Pat. No. 11,570,592, which is a continuation of application No. 15/858,632, filed on Dec. 29, 2017, now Pat. No. 10,368,216.

(51) Int. Cl.
  *H04B 11/00* (2006.01)
  *H04W 4/80* (2018.01)
  *H04W 84/18* (2009.01)

(52) U.S. Cl.
  CPC .......... *G01S 5/0036* (2013.01); *G01S 5/0081* (2013.01); *G01S 5/18* (2013.01); *H04B 11/00* (2013.01); *H04W 4/80* (2018.02); *H04W 84/18* (2013.01)

(58) Field of Classification Search
  CPC ........ G01S 1/76; G01S 5/0036; G01S 5/0081; G01S 5/18
  USPC ....... 455/208, 265, 404.2, 414.1, 456.1–457, 455/502, 450–452.2; 370/252, 304, 324, 370/350, 395.62, 503–520
  See application file for complete search history.

(56) References Cited

U.S. PATENT DOCUMENTS

| | | |
|---|---|---|
| 2012/0275554 A1 | 11/2012 | Lindqvist |
| 2013/0235864 A1 | 9/2013 | Do et al. |
| 2014/0340994 A1* | 11/2014 | Calvarese .................. G01S 5/18 367/117 |
| 2015/0160330 A1* | 6/2015 | Booij ........................ G01S 1/75 367/127 |
| 2015/0247916 A1 | 9/2015 | Bartov et al. |
| 2017/0168135 A1 | 6/2017 | Want et al. |

FOREIGN PATENT DOCUMENTS

| | | | |
|---|---|---|---|
| CN | 104303561 A | 1/2015 | |
| WO | WO 2004/051303 A1 | 6/2004 | |
| WO | WO-2004051303 A1 * | 6/2004 | ........... G01S 5/0036 |
| WO | WO 2013/008169 A1 | 1/2013 | |
| WO | WO-2013008169 A1 * | 1/2013 | ............... G01S 1/80 |
| WO | WO 2016/174396 A1 | 11/2016 | |

OTHER PUBLICATIONS

Written Opinion of the International Search Authority dated Apr. 12, 2019 for Appl. No. PCT/IB2018/060662, 8 pages.
SmartMesh WirelessHART User's Guide, Jan. 1, 2015, pp. 1-135, retrieved from the internet: URL:http/www.analog.com/media/en/technical-documentation/user-guides/smartmesh_wirelesshart_user_s_guide.pdf [retrieved on Apr. 2, 2019].
Lin et al., "Position Calculating and Path Tracking of Three Dimensional Location System based on Different Wave Velocities," Eighth IEEE International Conference on Dependable, Autonomic and Secure Computing , 436-441 ( 2009).

* cited by examiner

LOCATION DETERMINATION SYSTEM HAVING MESH INFRASTRUCTURE TO REDUCE POWER CONSUMPTION

CROSS-REFERENCE TO RELATED APPLICATIONS

This Application is a continuation of U.S. application Ser. No. 16/958,449, filed Jun. 26, 2020, which is a § 371 national stage entry of International Application No. PCT/IB2018/060662, with an International Filing date of Dec. 27, 2018, which is a continuation of U.S. patent application Ser. No. 15/858,632, filed Dec. 29, 2017, all of which are fully incorporated by reference in their entirety.

FIELD

The present disclosure relates generally to real-time location systems and more particularly to determining the location of an object or person within a real-time location system.

BACKGROUND

Modern businesses and organizations face a common challenge in tracking the location of important resources in a building or campus environment. Such resources include key personnel, critical pieces of equipment, vital records, or other useful devices. These resources often relocate throughout the day according to organizational needs, and locating these important resources can prove difficult and time consuming. In order to avoid the inherent productivity loss in devoting time and energy towards manually locating these resources, it is desirable to develop an approach that tracks, catalogues, and reports the location of these important resources in real-time.

SUMMARY

In an embodiment of the present disclosure, a wireless mesh network is described that includes a plurality of location tags and transmitting devices capable of transmitting and receiving a plurality of time pairings, wherein a time pairing is the pairing between a first local clock of a first device and a second local clock of a second device. The plurality of time pairings in the wireless mesh network statistically determines a relative clock drift from a synthesized reference clock for each location tag and acoustic transmitting device in the wireless mesh network. The relative clock drift for each device is compared to the synthesized reference clock and used realize time coordinated events between devices.

In a further embodiment of the present disclosure, a computer-implemented system is disclosed that includes a plurality of location tags and transmitting devices configured to form a wireless network that is configured to wirelessly communicate a plurality of time pairings, wherein a time pairing is the combined storage of a local clock of a first device and a second clock of a second device. The computer-implemented system also includes an acoustic transmitting device configured to receive the plurality of time pairings and transmit the plurality of time pairings to a central server. The computer-implemented system also includes the central server configured to receive the plurality of time pairings and synthesize a reference clock to which each of the device clocks can be compared.

In a further embodiment of the present disclosure, a computer-implemented method for utilizing a wireless mesh network is disclosed that includes storing by a first device a first local clock time. The computer-implemented method further includes receiving by the first device a second local clock time from a second device in the wireless mesh network. The computer-implemented method further includes transmitting a time pairing between the first local clock time and the second local clock time wherein the time difference is used to statistically determine a relative clock drift from a reference clock for each device and the relative clock drift is used to realize time coordinated events among the plurality of devices and transmitting devices.

BRIEF DESCRIPTION OF THE DRAWINGS

The accompanying drawings, which are incorporated herein and form a part of the specification, illustrate embodiments of the present disclosure and, together with the description, further explain the principles of the disclosure and enable a person skilled in the pertinent arts to make and use the embodiments.

Figure 1:
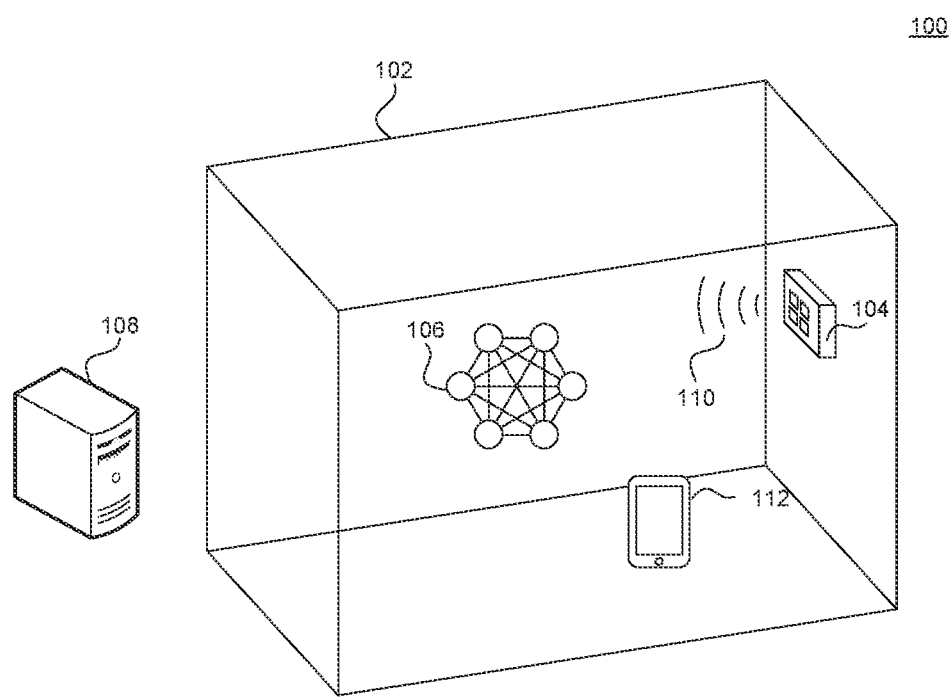
FIG. 1 illustrates a perspective representation of a real-time location system, according to example embodiments of the present disclosure.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

The present disclosure provides a real-time location system that tracks accurate location information of objects and persons. Real-time location systems operate with different levels of accuracy depending on available system infrastructure. In some embodiments, room-level accuracy of location information is sufficient. In some embodiments, a system provides three-dimensional location information about persons or equipment in real time. A real-time location system can include a network of acoustic transmitting devices attached to interior surfaces in an environment and location tags attached to moveable objects or people. The location tags receive signals from the acoustic transmitting devices to determine descriptive location information or three-dimensional locational coordinates within the environment. Acoustics, e.g., ultrasound, is well-suited for this purpose because it travels slower than radio waves and generally goes unnoticed by humans. Acoustic waves also attenuate more rapidly and are less likely to penetrate walls, which minimizes signal interference between rooms. If the location of the acoustic transmitting device is known, then the location of the location tag is in the near vicinity of the location of the particular acoustic transmitting device whose signals have been received. For example, if a particular acoustic transmitting device has been installed in a closed room and a location tag receives the acoustic signal from the particular acoustic transmitting device, then the location tag is located within the closed room. Acoustic signals are also easier to process when measuring a relatively short distance, as exists between the acoustic transmitting devices and the location tags described herein.

The systems and methods of the present disclosure can be used in a number of applications including, for example, location tracking, work flow, mobile equipment tracking, safety and compliance, mobile equipment management, staff location determination, or other suitable applications. One example field of use is within the health care industry. In an embodiment, a hospital implements a real-time location tracking system of the present disclosure to provide patient tracking, patient flow, asset management, environmental monitoring, etc.

Implementation of a real-time location system requires installation of a number of acoustic transmitting devices throughout the environment for which location determination is desired. These acoustic transmitting devices provide the necessary ID messaging that is received by the location tags, which are then used to provide location determination of the location tags. In addition, these acoustic transmitting devices need to be synchronized in time, and to be configured (e.g., periodicity of ultrasound transmissions, firmware upgrades, etc.). In an exemplary embodiment, the synchronizations in time and the configuration management are effected by a central server. For example, a central server will maintain a reference clock to which the internal clocks of the acoustic transmitting devices are synchronized. Similarly, updates to the configuration of these acoustic transmitting devices are routinely required, and are typically provided via the central server. The central server is merely exemplary, and any alternative centralized entity may be used to support the centralized functions.

To support the synchronization and the configuration management, the necessary communication paths to support the communication between the acoustic transmitting devices and the central server may be accomplished using a number of intermediate nodes, e.g., gateways. Using RF or other communication links, various communication messages between the acoustic transmitting devices and location tags are forwarded to the gateway that provides a footprint that covers the respective acoustic transmitting devices and location tags. Those communication messages are in turn forwarded to the central server. A typical arrangement for the communication pathways between the gateways and the central server is a star topology. In a star topology, each gateway is connected to the central server via a point-to-point connection. Such a topology offers various benefits, such as a simplicity in adding (or subtracting) additional gateways. In a typical star topology implementation, the point-to-point connections may be Ethernet connections and the individual gateways may be powered by power supplies that are, in turn, connected to the mains power supply. Power may also be supplied using a power-over-Ethernet approach. However, both the Ethernet connections and the power supply arrangements require extensive cabling to each and every gateway, and therefore this presents a disadvantage to the use of a star topology connection approach.

However, the required cabling presents unique challenges. Cost is a factor when installing the required gateways and other infrastructure where a star-network topology is utilized. In particular, the cost of cabling the gateways is substantial. For example, in an exemplary real-time location system, installation of 300 gateways could cost in the vicinity of two to three thousand dollars to provide each required power drop, and thereby upwards of one million dollars to provide the necessary installation. Such an installation may be good only for a few years, at which time retrofits of floor space demand a re-deployment of the gateways and a subsequent further expenditure of significant monies. In addition, power consumption among the gateway devices can also become excessive.

Therefore, a need exists for real-time location systems to provide accurate location information of location tags in an environment with reduced infrastructure requirements, e.g., a need for an approach that reduces the cabling and other costs associated with the infrastructure network of supporting connectivity of the acoustic transmitting devices and the location tags is desirable. The approach described herein reduces power consumption and dramatically reduces installation costs making the real-time location system more easily deployable, scalable, and efficient.

Embodiments of the approach described herein rely on battery-powered acoustic transmitting devices, and employ a wireless approach to connectivity from the various acoustic transmitting devices to the central server. Wireless connectivity is limited by the physical footprint over which wireless transmission may be reliably received. Given the size of exemplary environments (e.g., hospital) for which real-time location is desired, point-to-point wireless connectivity in a star topology is not feasible. The alternative approach may use a mesh network connectivity approach, where each connection between one end node (i.e., acoustic transmitting device) and a neighboring node may be accomplished by a wireless connection. In summary, having a system where the battery-powered infrastructure self-organizes into a mesh network is highly advantageous in reducing power consumption and the cost of installation. Use of a self-organizing mesh network for communication between the location tags and acoustic transmission devices and the central server either eliminates the need for the intermediate gateways, or substantially reduces the need for such intermediate gateways. The communication pathways in the mesh network are used to time-synchronize a number of transmission windows (e.g., the time windows during which acoustic transmissions are made by the acoustic transmission devices to location tags, the time windows during which RF transmissions between neighboring acoustic transmitting devices) across the real-time location system. Time synchronization among all members of the wireless mesh network to a reference clock (that may be located in a central server) allows the location tags and the acoustic transmission devices to utilize power only for a time sub-interval during which a transmission actually occurs. In addition, it allows for time of flight estimation (TOF) of the acoustic signals exchanged between transmitting deices and location tags. TOF data can then be used to estimate position data for the location tags and transmitter devices.

Mesh networks work best in situations where the nodes (e.g., gateways) have continual access to power, and therefore will unfailingly pass messages from end nodes back to a server. In contrast, mesh networks are not reliable for backhaul purposes to dependably convey messages from end nodes back to a server via intermediate nodes that are battery powered. In particular, battery powered nodes that enter a sleep mode are difficult intermediate nodes as their sleep cycle may not be coordinated to provide a reliable means for backhaul of critical messages to the server. Battery powered nodes are particularly vulnerable when the messages contain the information that is used to provide a synchronized sleep schedule by which the battery powered nodes will be awake to reliably forward the messages from which the synchronization schedule is derived. Thus, while the benefits of battery-powered nodes are clear in that the cost of a buildout of such nodes is substantially less than the equivalent constantly-powered nodes, the design of timing messages that use such battery-powered nodes in the backhaul link is not straightforward. It is with these challenges in mind that embodiments of the approach described herein were developed.

Real-Time Location Systems

Real-time location systems have been developed using various wireless protocols with perhaps the best known system being the global positioning system (GPS). While such location systems provide horizontal location accuracies on the order of approximately 8 meters, these systems do not solve all location-tracking scenarios. For example, many scenarios require location accuracies of less than 0.3 meters. Other scenarios require the ability to distinguish between floors in a high-rise building. Still other scenarios necessitate contextual location information, such as room-based information in an office building.

Embodiments of the present disclosure provide solutions to these augmented location requirements. Acoustic signals may be used to determine the location of location tags, attached to persons or objects, by transmitting acoustic signals from acoustic transmitting devices, which may be fixed to the walls or ceilings of a building. In an exemplary embodiment, the location of the location tags may be determined in three dimensions. In a further exemplary embodiment, the acoustic signals include identifiers (including encoded identifiers) assigned to their respective acoustic transmitting device. The location tags detect or decode the identifying information in the acoustic signals. If the location of the acoustic transmitting device is known, then the location of the location tag is in the vicinity of the location of the particular acoustic transmitting device whose signals have been received. For example, if a particular acoustic transmitting device has been installed in a closed room and a location tag receives the acoustic signal from the particular acoustic transmitting device, then the location tag is located within the closed room. Therefore, if each of the acoustic transmitting devices emits a unique identifying signal and the location of each acoustic transmitting device is known, then the location of a location tag may be determined upon its receipt of an acoustic signal from a particular acoustic transmitting device and its associated identity.

Similarly, if a location tag receives acoustic signals from each of two separately identifiable acoustic transmitting devices, then the location tag is located in the vicinity of both of the two separately identifiable acoustic transmitting devices. For example, were the two separately identifiable acoustic transmitting devices placed at the two opposite ends of a corridor, then a location tag situated in the corridor would likely receive signals from the two separately identifiable acoustic transmitting devices, and the location of the location tag would be established. In other embodiments, more precise locations of a location tag may be established. For example, arrival times of acoustic signals at a location tag can be used to find the location of the location tag in the environment, using standard geometric calculations.

In an embodiment, the acoustic signals may also include data associated with the environment near the acoustic transmitting device such as one or more rooms, spaces, structures, buildings, regions, etc. in which the acoustic transmitting device resides. More particularly, such environmental data can include specific details associated with the environment. For instance, the environmental data can indicate the respective room, building, campus, area, etc. where the acoustic transmitting device is located. The environmental data can further include data specifying an organization, configuration, or hierarchy of the environment in which the acoustic transmitting device is located. For instance, such environmental data can include data specifying a relationship between a particular room and a particular building (e.g., a location of the room within the building).

The environmental data can further include dimensional data associated with the environment. For instance, dimensional data can include the dimensions of one or more reflective surfaces (e.g. walls, ceilings, floors, objects, furniture, etc.) within a room in which a transmitting device is located. The dimensional data can further include data indicative of the normal direction of the reflective surfaces. The environmental data can further include data indicative of the acoustic attenuation of such reflective surfaces. The environmental data can further include data indicative of the relative locations of the acoustic transmitting devices within a particular room, building, area, etc. More particularly, such environmental data can include an identifier of a surface (e.g. wall, floor, ceiling, etc. of a room) on which a transmitting device is located and/or data indicative of a location and/or orientation of the transmitting device with respect to the surface. The environmental data can further include atmospheric data indicative of the speed of sound, temperature, pressure, humidity, etc. within the environment. In certain embodiments, since the environmental data changes over time, the environmental data updates frequently to reflect current environmental conditions.

The acoustic transmitting devices of the real-time location system can be configured to periodically transmit acoustic signals (or other suitable signals, such as radio frequency signals) to be received by location tags located within broadcast range of the transmitting devices. In some implementations, the acoustic signals can be ultrasonic signals having a frequency of about 20 kHz or greater. In a particular embodiment of the present disclosure, the acoustic signals can be ultrasonic signals having a frequency of about 20 kHz. In another particular embodiment of the present disclosure, the acoustic signals can be ultrasonic signals having a frequency of about 40 kHz. As used herein, the term "about," when used in reference to a numerical value, refers to within 30% of that value.

In this manner, a location tag within the broadcast range of the acoustic transmitting devices picks up acoustic signals. The acoustic signals can be signals propagating directly from the acoustic transmitting devices to the location tags (referred to herein as "direct signals") and/or signals reflected by one or more reflective surfaces (referred to herein as "reflected signals"). The reflective surfaces can act as sonic mirrors capable of reflecting acoustic signals (with some attenuation) and can include walls, ceilings, floors, furniture, objects, etc. located within the environment. The precise location of a location tag can be determined based at least in part on the acoustic signals received from the acoustic transmitting devices. In some implementations, contextual or descriptive location information may be provided, e.g., room number or floor number in an office building.

Maintaining time synchronization among the acoustic transmitting devices and the location tags is essential in the above-described location determination system in order to minimize power consumption and reduce infrastructure requirements. In addition, it allows for time of flight estimation (TOF) of the acoustic signals exchanged between transmitting deices and location tags. TOF data can then be used to estimate position data for the location tags and transmitter devices. In an embodiment, location tags maintain time synchronization with the acoustic transmitting device that they are associated with by listening for the acoustic signals sent by the acoustic transmitting devices within a coordinated subinterval of time. However, in an alternate embodiment, the location tag may obtain similar information by transmitting a probe request to a central server that replies with information on identities, configurations, and clock values.

In an embodiment, arranging the location tags and acoustic transmitting devices into a self-organizing, self-determining wireless mesh network provides further advantages. Where a location tag communicates with a wireless access unit, additional infrastructure must be installed to add wireless access units and provide sufficient power to them. Such infrastructure could include gateways, power drops, hubs, wiring, Bluetooth beacons, antennas, etc. Unit-to-unit communication allows the needed information to propagate from the location tags and acoustic transmitting devices without the need for any additional infrastructure to be installed in the environment. In this manner, a time synchronization system can function independently of the existing gateways either by synchronizing time locally or at a central observer. Embodiments provide synchronization information by returning calculated time offsets and drifts (with respect to a reference clock) to the members through the mesh network itself.

The wireless mesh network is self-organizing because location tags receive and transmit packets containing information about local clock times without any centralized coordination. The members of the wireless mesh network neighbors within transmission range and transmit timestamp pairs and local time stamps to the neighbors. The timestamp pairs consist of the local clock time and the local clock time of the neighbor. A local time stamp is the time on the mesh network member prior to comparison or differentiation with respect to any other member of the mesh network. Eventually, these timestamp pairs reach a central server, which calculates the clock offset and drift for all of the location tags and transmitter devices using known statistical methods, which will be understood by one skilled in the art.

Device Clock Tracking

In an exemplary wireless mesh network, the wireless nodes comprise one or more location transmitters. The exemplary mesh network is connected to a server that provides various centralized functions for the real-time location system. The nodes in the mesh network are positioned throughout an environment so that the wireless coverage footprint of each node in the network overlaps with the wireless coverage footprint of at least one other node. The overlapping wireless footprints ensure that there is network connectivity from any one network node to any other network node in the mesh network, and more particularly between any one network node back to the server, which is coupled to the network. In certain embodiments, the wireless mesh network connects with the server via a gateway. In other embodiments, the wireless mesh network may directly connect to the server. In these embodiments, the server has an internal wireless transceiver that is a node within the wireless mesh network. In further embodiments, an environment (e.g., a building) may be divided into two or more separate clusters. By separate, it is meant that the acoustic footprint of one cluster does not overlap with the acoustic footprint of another cluster. In these embodiments, all units in one cluster would be synchronized with each other, while units from this one cluster are not synchronized with units from another cluster. A single server may perform the analysis to support the synchronization of the units with each cluster.

Each node in an exemplary wireless mesh network may contain a radio module for provision of the wireless transmission and reception functions. The radio module includes a timer that is locked to a crystal oscillator to provide a stable time reference. This timer may be referred to as a device clock. In an exemplary embodiment, the crystal oscillator may have a frequency of 32 kHz, with 10 ppm (parts per million) accuracy. The 32 kHz frequency is merely exemplary, and not limiting. With a frequency of 32 kHz, each clock tick will be approximately 0.03 milliseconds. Using a 24-bit word for the output of the timer, and the nominal frequency of 32 kHz, the timer word value will wrap around (i.e., repeat) approximately every 10 minutes. Timer resets result in a word value being reset to an initial starting point, e.g., 0. With the exemplary 10 ppm accuracy, the timer will accumulative an error of approximately 1 millisecond over a duration of 100 seconds. Since the acoustic (e.g., ultrasonic) transmission schedule of a real-time location system requires synchronization across the device clocks (device timers) in the real-time location system, such synchronization requires that an on-going compensation for each device timer be provided to compensate for device clock drift and clock offset (e.g., device resets).

In an embodiment, compensation for device clock drift and clock offset may be derived from timestamp pairings. A pairing results when a message is broadcast wirelessly from one device (D1) and received by a second device (D2). When device D1 broadcasts a message, such a message may include a timestamp from the clock of the originating device D1. Upon receipt of the message, a timestamp from the clock of receiving device D2 may be added to the message. Consequently, with each received message, a pair of clock timestamps is observed, one timestamp from the broadcasting device and one timestamp from the receiving device. Observation of these pairs of clock timestamps therefore provides a means to synchronize these two devices base on these pair observations. Although there is jitter due to device interrupts used to provide the timestamps, and delays due to times of RF transmission and code execution, their effect may be compensated for. For example, a constant delay may be readily accounted for. Similarly, jitter may be compensated for by statistical methods. An example of messaging system in which such timestamps may be observed is the Snobee Data Request broadcast messaging protocol.

The observed timestamp pairings eventually reach the server that is coupled to the wireless mesh network. In an example, a timestamp pairing (D1, D2) results when a message is broadcast by device D1 and received by D2. Device D3 is also within the broadcast range of device D1, and therefore receipt by device D3 of the same message broadcast by device D1 results in another timestamp pairing (D1, D3). In a further message that is broadcast from D2 to D3, a further timestamp pairing may be observed (D2, D3). By virtue of propagation of these messages to the server, the server is in a position to receive numerous observations of timestamp pairings of various pairs of neighboring nodes that communicate with one another. In particular, over a time period, the server will receive multiple observations of the same (D1, D2) timestamp pairings. These multiple observations may then be analyzed by the server to identify the relationship of the respective timers in devices D1 and D2. In an exemplary analysis, the relationship of the respective timers in devices D1 and D2 may be represented by a linear fit, where the slope of the linear fit represents the relative drift of the respective timers in devices D1 and D2. Similarly, the constant in the linear fit relationship represents the offset in the respective timers in devices D1 and D2.

The linear fit process is typically an iterative process, with the number of iterations possibly being a configurable number. With any iterative process, failure conditions are often identified such that a reset or other process is initiated when the linear fit process fails. For example, one or more of the following situations may result in a failure determination: (1) no solution is determined within the configurable number of iterations (e.g., 10 iterations), (2) the number of remaining valid points in the linear fit buffer is below a configurable number of valid points (e.g., 5), or (3) the average residual per valid remaining data point exceeds a configurable threshold. A failure would result in a determination that a device clock pair has not been "locked", i.e., the device clock pair is unlocked. A pair may be unlocked when there are an insufficient number of data points or the quality of the linear fit is poor. In such an unlocked scenario, the server is notified when a device or gateway resets and immediately unlocks the tracking pairs involving the device or gateway and clears the associated fit buffers.

Each device pair may receive a determination of its status, either unlocked or locked. To facilitate management of the device clock pairings, the server may maintain the observed device pairings in a structure that captures the relevant data for each unique pairings. Because for purposes of analysis and tracking, the pairings (D1, D2) and (D2, D1) are the same, the same structure may be used for both pairings.

Acoustic (Ultrasound) Schedule

The purpose of time synchronization in a real-time location system is to ensure that, for example, each location transmitter in the real-time location system is provided a schedule for transmitting an acoustic (e.g., ultrasonic) message such that all location transmitters (at least within a cluster) transmit at the same time. For example, for a schedule of transmitting one acoustic message per second, it is desirable that each location transmitter (i.e., node) in the mesh network transmits its particular acoustic message at the same time as the other location transmitters. By ensuring that all location transmitters transmit at the same time, the design of the location tags (that receive the acoustic message) is greatly simplified. Furthermore, the battery life of the location tags is greatly extended by such a synchronized (simultaneous) acoustic message broadcast. To ensure such synchronization, each device requires an individualized schedule to be provided to it, where such schedule uses values in terms of the local clock values of that device. Following the completion of locks of the various device pairs in the network and the selection of a reference clock in the network, the server provides such an individualized schedule to the various location transmitters in the mesh network.

After a sufficient number of pair locks have occurred, the server may select a reference clock. The acoustic (ultrasonic) schedule for each device is set by the reference clock, and an acoustic schedule is computed based on the local clock for the particular device. The acoustic schedule contains an offset and a period with respect to the local device node. The reference clock sets the period of the acoustic schedule for all location transmitters. A reference clock may be selected based on such factors as being in the physical middle of the mesh network such that the path lengths from the reference clock to the location transmitters are minimized. If the reference clock becomes unavailable, the server may pick another reference clock in the mesh network. One approach to the selection of another reference clock is to attempt to preserve the offset while changing to the slightly different period of the new reference clock. Another approach to the selection of another reference clock is to use a synthesized clock located at the server to which all devices are synchronized.

The server continues to monitor the observation clock pairs, and updates the fit between the observation clock pairs. An updated schedule for a device node is forwarded to the device node as required. In order to save resources, an update may be limited to one per five minutes in order to save resources. The five minutes is merely exemplary, and is configurable. Although much longer durations between updates may be possible, shorter durations between updates may be required in order to promptly deal with the loss of the reference clock.

Propagation of acoustic schedules to their respective device nodes may be accomplished by identification of an optimal routing through the mesh network to the location transmitter. Routing often requires a graphical understanding of the connection paths available between the various nodes in the mesh network. Optimal routing may be based on the strength of the wireless signal strength along various possible connections paths to the location transmitter. Based on the determined pathway between the reference clock and the clock of the location transmitter of interest, the acoustic schedule may be determined by a linear combination of each device pair along the determined pathway to form the desired mapping between the reference clock and the location transmitter clock.

FIG. 1 is a perspective representation of location determination system 100. Location determination system 100 can be a real-time location system in an environment that determines the location of a moveable object or person. Placed within environment 102, location determination system 100 can include one or more acoustic transmitting devices 104, mesh network 106, remote processing server 108, modulated acoustic signals 110 and one or more location tags 112.

These components cooperate to provide a location determination system 100 the capability of estimating a location of each location tag 112 within environment 102. In certain embodiments, location information may be three-dimensional location information. In typical embodiments, location determination system 100 includes more than one instance of acoustic transmitting device 104 installed throughout a building or series of rooms and more than one instance of location tag 112 attached to, or incorporated into/onto, people, machines, animals, vehicles, robots, stock, equipment, or other objects. Environment 102 can consist of rooms in a building such as, for example, a ward in a hospital, an office in an office building, or a storage space in a warehouse. More than one instance of environment 102 can exist and include more than one instance of acoustic transmitting device 104 and mesh network 106. When several instances of environment 102 serve one location, building, or complex, these instances of environment 102 can be incorporated into clusters, groups, or management entities. In an alternate embodiment, environment 102 comprises a single room.

Acoustic transmitting device 104 includes an acoustical device, such as an ultrasonic sounder, and processing logic to transmit modulated acoustic signals 110. Modulated acoustic signals 110 transmitted by acoustic transmitting device 104 communicate an identifier that is unique to a specific instance of acoustic transmitting device 104. In an embodiment, acoustic transmitting device 104 modulates/encodes the identifier on an ultrasonic carrier having an ultrasonic frequency such as, for example, about 20 kHz, 40 kHz, or any other suitable ultrasonic frequencies. As described above, location determination system 100 can include more than one instance of acoustic transmitting device 104, and each acoustic transmitting device 104 can be configured to transmit modulated acoustic signals 110 containing an identifier unique to that instance of acoustic transmitting device 104. Also, in some embodiments, location determination system 100 comprises more than one instance of acoustic transmitting device 104 disbursed throughout multiple instances of environment 102.

Location tags 112 include a microphone capable of receiving modulated acoustic signals 110 from acoustic transmitting device 104, and may include as well as a processing unit to sample, decode, detect and process any received modulated acoustic signals 110. Location tag 112 resides inside environment 102, and is typically not placed immediately adjacent to the walls or the ceiling. Location tags 112 may be a portable device, and may be attached to a person or item of equipment. In some embodiments, location tags 112 are devices such as, for example, a cell phone, an acoustic transducer, an ultrasound transducer, an acoustic tag, an ultrasound tag, and/or any other suitable devices.

In some embodiments, location tags 112 do not perform processing using their own processing units (or do not have their own processing units), but offload the processing to a remote computer such as remote processing server 108 by transmitting relevant data to remote processing server 108 using one or more appropriate communication channels, e.g., acoustic, ultrasound, or radio frequencies. Location tags 112 and/or acoustic transmitting device 104 include a wired or wireless transmitter, such as a radio transmitter, for transmitting information relevant to a real-time location determination. In some embodiments, location tags 112 communicate with remote processing server 108 via radio frequencies, a Local-Area Network (LAN), a Wide-Area Network (WAN), or other communication network or protocol.

Mesh network 106 self-organizes its members to provide communication pathways through the network from the end nodes to central server 108, or to a gateway preceding central server 108. Members of mesh network 106 include two or more acoustic transmitting devices 104. End nodes include an acoustic transmitting device 104 and/or a location tag 112. Communication pathways support messaging and/or signaling carrying time clock information to support time synchronization of real-time location devices to a reference clock. Communications propagate through mesh network 106 containing timing information between members of mesh network 106. In an embodiment, the timing information includes time-stamp pairs, wherein each time-stamp pair is an indication of the relative clock information of each of the two devices involved in the communication. A message or other signal captures this time-stamp pair information for the two devices involved, and forwards this information to central server 108 via mesh network 106. By capturing time-stamp pair information for each of two neighboring devices in the mesh network, and forwarding same to central server 108, the relative time pairings for all members of the mesh network may be determined. Based on these relative time pairings (i.e., offsets) and the use of a synthesized reference clock in central server 108, time synchronization of all members of the mesh network may be achieved. Time-stamp pairs for the same devices may be determined over time and forwarded to central server 108. These time-stamp pairs form a statistically meaning sample of data from which to determine relative clock offset and drifts over time for the members of mesh network 106.

Remote processing server 108 (e.g., central server) consists of one or more servers processing real-time location data constituting, for example, identities of location tags and acoustic transmitting devices, locations of acoustic transmitting devices, RF access points, etc. Remote processing server 108 employs standard communication modules (e.g., RF, wireline) to listen for, process, and respond to incoming signals. Remote processing server 108 includes processes to perform operations and calculations and radio frequency modules to transmit signals back to mesh network 106 and acoustic transmitting device 104. In an alternate embodiment, remote processing server 108 communicates to acoustic transmitting device 104 and mesh network 106 via a LAN, WAN, or other wireless/wired communication network.

Remote processing server 108 includes a database, which stores information about acoustic transmitting devices 104 and location tags 112 and tracks locations in real-time. In an embodiment, the database may be any commercially available database management system such as Microsoft Access, Microsoft SQL server, an Oracle database, an IBM database, etc. The database maintains communicative connections to the processing elements via traditional networking infrastructure such as routers, switches, hubs, firewalls, etc. In an embodiment, the database may be situated in one computer workstation. Remote processing server 108 implements a centralized storage area network, network-attached storage, redundant array of independent disks, and/or any other configuration of storage devices to supply sufficient storage capacity to archive the full panoply of locational information. Sufficient storage alternatively exists in any other physically attached magnetic storage, cloud storage, or any additional storage medium. In an embodiment, remote processing server 108 deploys a commonly utilized hard-disk interface, such as ATA, SATA, SCSI, SAS, and/or fiber for interfacing with a storage medium.

In an embodiment, remote processing server 108 receives the multitude of time pairings from wireless mesh network 106. Remote processing server 108 performs calculations and employs statistical models to determine a relative clock offset and drift from a reference clock for all members of mesh network 106. Remote processing server 108 then transmits the clock offset information back through mesh network 106 to each member. In another embodiment, remote processing server 108 utilizes existing wireless or wired infrastructure to return the clock characteristics or derived schedules to all members of a location determination system 100.

Modulated acoustic signals 110 include an assemblage of signals transmitted from acoustic transmitting devices 104 that propagate within environment 102. In an embodiment, modulated acoustic signals 110 fall in the ultrasonic range, i.e., 20 kHz up to 10 MHz and beyond. Specific embodiments include modulated acoustic signals at 20 kHz, and at 40 kHz. Location determination system 100 modulates, encodes, identifies, and detects/decodes modulated acoustic signals 110 in order to differentiate among various signals and determine locations.

Modulated acoustic signals 110 can include data descriptive of characteristics of the acoustic signals including, for example, a sound pressure level, signal coding type, signal identification, signal direction normal, signal spatial distribution, signal period, and/or other suitable data. Modulated acoustic signals 110 can further include data associated with an environment covered by location determination system 100. Such environmental data can include a layout or organizational hierarchy of the environment, identifying data of the location within the environment (e.g. room, area, space, region, building, etc.) in which acoustic transmitting device 104 sits, dimensional specifications of one or more reflective surfaces (e.g. walls, ceilings, floors, objects, etc.) within the environment (e.g. within a room, area, region, etc. in which acoustic transmitting device 104 is located), data indicative of the relative location of acoustic transmitting device 104 within the environment, such as an identifier of the surface on which acoustic transmitting device 104 is located and/or a location and/or orientation of acoustic transmitting device 104 with respect to the surface. The environmental data can further include atmospheric data indicative of the speed of sound, temperature, pressure, humidity, etc. within the environment. In certain embodiments, because the environmental data changes over time, the environmental data may be frequently updated to reflect current environmental conditions.

Modulated acoustic signals 110 include a code identifier. In an embodiment, mesh network 106 receives modulated acoustic signals 110 and utilizes the received code identifier to determine the identity of the instance of acoustic transmitting device 104 that transmitted those modulated acoustic signals 110. In an alternate embodiment, mesh network 106 forwards the sequence of codes to remote processing server 108 via a wireless network connection, a Local-Area Network (LAN), a Wide-Area Network (WAN), or other communication network or protocol. In this embodiment, remote processing server 108 performs the processing and determines the identifier of acoustic transmitting device 104.

Coordinating Time Via a Mesh Network

Time synchronization between network devices may occur utilizing a standard star/tree network topology. However, as noted above, such an approach mandates expensive additional infrastructure requirements for the intermediate gateways, e.g., expensive power drops, hubs, and routers that must be installed in order to facilitate communication pathways when operating in a standard star/tree network topology.

In embodiments of the present disclosure, a mesh network infrastructure system is described that circumvents these additional infrastructure requirements. Utilizing a self-organizing and self-defining mesh network allows acoustic transmitting device 104 and one or more location tags to synchronize to a reference clock. By self-organizing into a mesh network and passing time pairings between mesh members to a central server, the system can statistically determine a time offset and time drift for each particular member in the mesh network. Then, utilizing these device specific timing characteristics, the overall system coordinates transmissions to a particular sub-interval in order to conserve power resources.

Figure 2:
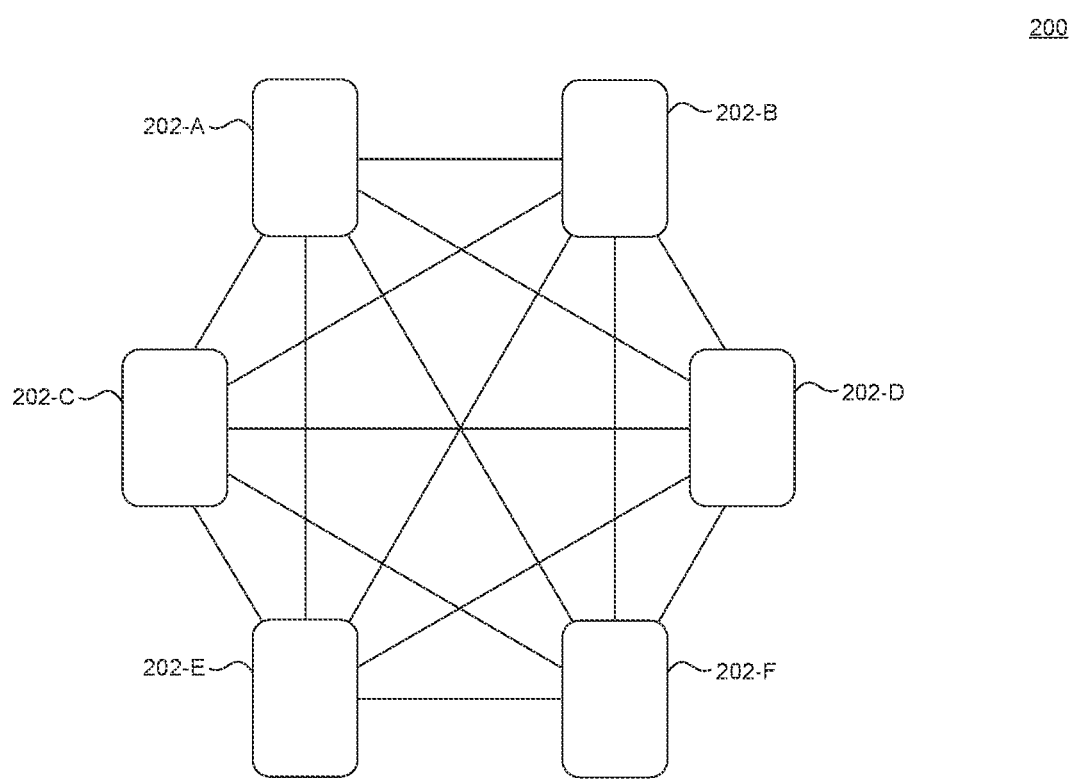
FIG. 2 illustrates a block diagram of an exemplary mesh infrastructure system as used in a real-time location system, according to example embodiments of the present disclosure.

FIG. 2 depicts mesh network 200, according to embodiments of the present disclosure. Mesh network 200, depicted in FIG. 1 as mesh network 106, consists of mesh members 202, described in FIG. 2 as mesh members 202-A, mesh members 202-B, mesh members 202-C, etc. A mesh member may be an acoustic transmitting device 104 or a location tag 112. Communications from one mesh network member to any other mesh network member within the physical wireless communication footprint from the first mesh network member may be achieved with the mesh network approach. Neighboring nodes in mesh network 200 agree on a wake-up rendezvous time window during which messages/signals are exchanged. The exchanged messages/signals include timing information, such as time-stamp pair that is an indication of the relative clock information of each of the two devices involved in the particular communication. Embodiments may exchange messages/signals that include timing information on a relatively slow schedule, e.g., one per minute.

Mesh network 200 may use any physical layer approach suitable for network communication. For example, mesh network 200 may be implemented using a low power radio mesh network (e.g., Zigbee) that has a physical footprint of 30 to 50 meters when operating in a radio frequency range from 2.4 GHz to 2.5 GHz. Other alternative frequencies include other industrial, scientific and medical (ISM) bands such as the 433 MHz, 868 MHz and 915 MHz bands. The Zigbee mesh network is a non-limiting example of a mesh network. Furthermore, embodiments of the approach describe herein do not place a limit on the number of "hops" that a message/signal makes in traversing through mesh network 200. However, there is a message loss that increases with the number of "hops" from that a message/signal encounters in propagating through mesh network 200. Mesh network 200 may not only provide a self-organizing mesh network, but may in an embodiment also determine a minimum path for a message or signal to traverse from one network node to another network node in mesh network 200. For real-time location system 100, mesh network 200 does not need to meet any strict transport layer requirements. For example, the amount of latency incurred when a message/signal propagates through mesh network 200 is not a critical factor for use of mesh network 200 in real-time location system 100.

Figure 3:
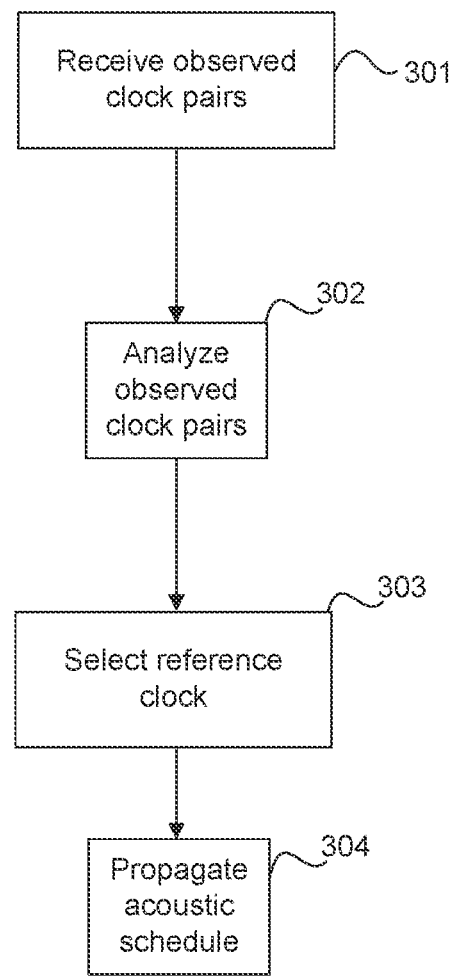
FIG. 3 illustrates a method of generating an acoustic transmission schedule based on an analysis of observed clock pairings to provide synchronized acoustic transmissions for a real-time location system, according to example embodiments of the present disclosure.

FIG. 3 illustrates a flowchart diagram of a method of synchronizing the clocks of one or more mesh node members 202 (i.e., acoustic transmitting devices 104 and location tags 112) with a reference clock utilizing mesh network communications, according to embodiments of the present disclosure. Mesh synchronization method 300 consists of receive observed clock pairs step 301, observed clock pair analysis step 302, select reference clock step 303, and propagate acoustic schedule step 304.

In receive observed clock pairs step 301, central server 108 receives a number of observed clock pairs from mesh network 106. The mesh network is self-organizing and self-configuring, and each member of mesh network 106 aims to connect to receive and transmit communications from and to all other members of mesh network 106 that fall within a transmission range. In an embodiment, these communications occur through a standard wireless protocol (e.g., Bluetooth, WLAN, Zigbee, etc.). A clock pairing results when a message is broadcast wirelessly from one node in the mesh network and received by a second node in the mesh network. When one node broadcasts a message, such a message may include a timestamp from the clock of the originating node. Upon receipt of the message, a timestamp from the clock of receiving node may be added to the message. Consequently, with each received message, a pair of clock timestamps is observed, one timestamp from the broadcasting node and one timestamp from the receiving node. Thus, a pairing is a pair of two timestamps, with one timestamp provided by each clock of the two respective devices involved in the original communication. For example, mesh member 202-A may communicate with mesh member 202-B, whereby a pair is formed by associating timestamp from mesh member 202-A and timestamp from mesh member 202-B from mesh member 202-B.

In observed clock pair analysis step 302, mesh synchronization method 300 determines a best fit for a time pairing between each of the two devices that resulted in the origination of the timing message that traversed mesh network 106. As noted above, a pairing is a pair of two timestamps, with one timestamp provided by each clock of the two respective devices involved in the original communication. For example, mesh member 202-A may communicate with mesh member 202-B, whereby a pair is formed by associating timestamp from mesh member 202-A and timestamp from mesh member 202-B. For example, over a time period, the central server 108 will receive multiple observations of the same timestamp pairings. These multiple observations may then be analyzed by the server to identify the relationship of the respective timers in the respective mesh members. In an exemplary analysis, the relationship of the respective timers in respective mesh members may be represented by a linear fit, where the slope of the linear fit represents the relative drift of the respective timers in the mesh members. Similarly, the constant in the linear fit relationship represents the offset in the respective timers in the mesh members.

In select reference clock step 303, mesh synchronization method 300 examines the various mesh members to select a reference clock. In one approach, the reference clock may be selected based on its location in the middle of the environment 102 in order to reduce the path lengths from the reference clock to the location transmitters.

In propagate acoustic schedule step 304, the transmit schedule is propagated to mesh member 202-A. In an approach, the transmitted acoustic (ultrasound) schedule includes the determined time offset and drift to mesh member 202-A so that its acoustic transmissions are synchronized with all other devices in real-time location system 100. For example, a time offset of 24 is communicated to mesh member 202-A. Upon receipt of this communication, mesh member 202-A knows that its clock is 24 clock cycles ahead of the reference clock, and adjusts its time windows for transmission and reception accordingly.

Figure 4:
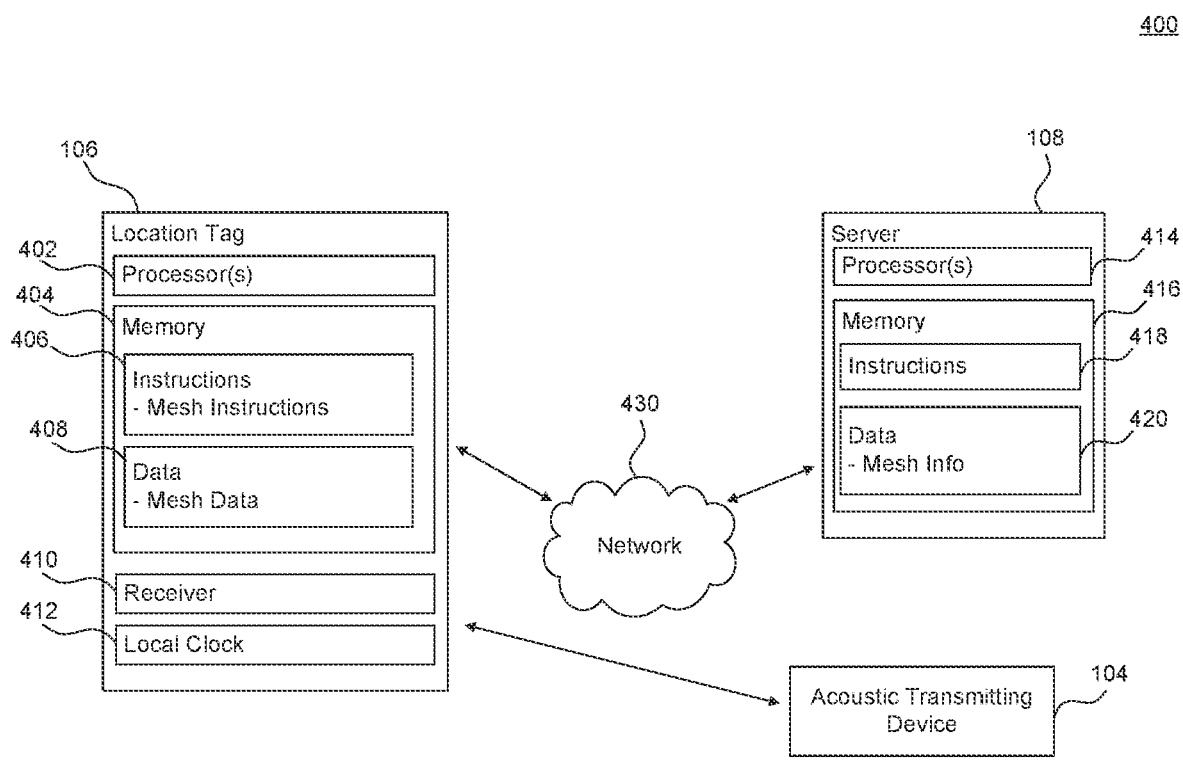
FIG. 4 illustrates an example computing system according to example aspects of the present disclosure.

FIG. 4 depicts an example real-time location system 400 that can be used to implement the methods and systems of the present disclosure. In some implementations, real-time location system 400 is a real-time location system configured to determine the locations of persons and objects. Real-time location system 400 can be implemented using a client-server architecture that includes mesh network 106 that communicates with one or more remote computing devices, such as remote processing server 108. Real-time location system 400 can be implemented using other suitable architectures.

As shown, real-time location system 400 can include a mesh network 106, an acoustic transmitting device 104, and a location tag 112. In an embodiment, location tag 112 is any suitable type of mobile computing device, such as a smartphone, tablet, cellular telephone, wearable computing device, or any other suitable mobile computing device. In some implementations, location tag 112 is a dedicated tag (e.g. passive or active) or other device for use in the real-time location system. Location tag 112 can include one or more processors 402 and one or more memory devices 404.

One or more processors 402 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. One or more memory devices 404 can include one or more computer-readable media, including, but not limited to, non-transitory computer-readable media, RAM, ROM, hard drives, flash memory, or other memory devices.

One or more memory devices 404 can store information accessible by one or more processors 402, including instructions 406 executed by one or more processors 402. For instance, one or more memory devices 404 can store the instructions 406 for implementing one or more modules configured to implement acoustic transmitting device 104, mesh network member 202-A, remote processing server 108, and/or other suitable instructions.

Each of acoustic transmitting device 104, mesh member 202-A, location tag 112 and remote processing server 108 can include computer logic utilized to provide desired functionality. Thus, each of acoustic transmitting device 104, location tag 202-A, remote processing server 108 can be implemented in hardware, application specific circuits, firmware and/or software controlling a general purpose processor. In one embodiment, each of acoustic transmitting device 104, mesh member 202-A, location tag 112 and remote processing server 108 are program code files stored on a storage device, loaded into memory and executed by a processor, or provided from computer program products, for example computer executable instructions stored in a tangible computer-readable storage medium such as RAM, hard disk or optical or magnetic media. Acoustic transmitting device 104, mesh member 202-A, location tag 112 and remote processing server 108 can each correspond to one or more different programs, files, circuits, or sets of instructions. Likewise, two or more instances of acoustic transmitting device 104, mesh member 202-A, location tag 112 and remote processing server 108 can be combined into a single program, file, circuit, or set of instructions.

Instructions 406 can further include instructions for implementing a browser, for running a specialized application, or for performing other functions on location tag 112. For instance, the specialized application can be used to exchange data with remote processing server 108 over the network 420. Instructions 406 can include client-device-readable code for providing and implementing aspects of the present disclosure. For example, instructions 406 can include instructions for implementing an application associated with location determination system 100 or a third party application implementing asset tracking or other services on location tag 112.

Location tag 112 can also include data 408 that one or more processors 402 retrieves, manipulates, creates, or stores. Data 408 can include, for instance, identifiers, sequences of codes, random numbers, acoustic model data, sensor data, and/or other data. Location tag 112 can include various input/output devices for providing and receiving information from a user, such as a touch screen, touch pad, data entry keys, speakers, and/or a microphone suitable for voice recognition. For instance, location tag 112 can multiple input buttons signifying different events. In an exemplary embodiment, a person in a hospital could press a button to signal distress.

Location tag 112 can further include receiver 410. Receiver 410 can be any device or circuitry for receiving, listening for, decoding, interpreting or otherwise processing modulated acoustic signals 110 from acoustic transmitting device 104. Location tag 112 can also include a network interface used to communicate with remote processing server 108 or acoustic transmitting device 104 over network 420. The network interface can include any suitable components for interfacing with one more networks, including for example, transmitters, receivers, ports, controllers, antennas, or other suitable components. Location tag 112 can further include a communication system used to communicate with acoustic transmitting device 108. The communication system can include, for instance, one or more transducers (e.g. microphone devices) configured to receive acoustic (e.g. ultrasonic) signals from acoustic transmitting device 104.

In some implementations, location tag 112 can be in communication with a remote computing device, such as remote processing server 108 over network 420. Remote processing server 108 can include one or more computing devices. Remote processing server 108 can include one or more computing devices and can be implemented, for instance, as a parallel or distributed computing system. In particular, multiple computing devices can act together as a single remote processing server 108.

Similar to location tag 112, remote processing server 108 can include one or more processors 412 and memory 414. One or more processors 412 can include one or more central processing units (CPUs) and/or other processing devices. Memory 414 can include one or more computer-readable media and store information accessible by one or more processors 412, including instructions 416 that can be executed by one or more processors 412 and data 418.

Data 418 can be stored in one or more databases. The data can include identifier information, acoustic model data, and other data required by location determination system 100. One or more databases can be connected to remote processing server 108 by a high bandwidth LAN or WAN or can also be connected to remote processing server 108 through network 420. The one or more databases can be split up and reside in distributed or multiple locales.

Remote processing server 108 can also include a network interface used to communicate with acoustic transmitting device 104, mesh member 202-A, and location tag 112 over network 420. The network interface can include any suitable components for interfacing with one more networks, including for example, transmitters, receivers, ports, controllers, antennas, or other suitable components.

Network 420 can be any type of communications network, such as a local area network (e.g. intranet), wide area network (e.g. Internet), cellular network, or some combination thereof. Network 420 can also include direct connections between acoustic transmitting device 104, mesh member 202-A, location tag 112, and remote processing server 108. Network 420 can include any number of wired or wireless links and instrumented using any suitable communication protocol.

Location system 400 can further include one or more instances of acoustic transmitting device 104. Acoustic transmitting device 104 can transmit acoustic signals (e.g. ultrasonic signals) as described in FIG. 1. In some implementations, acoustic transmitting device 104 can transmit other suitable signals, such as radio frequency signals. Acoustic transmitting device 104 can be implemented using any suitable computing devices. Acoustic transmitting device 104 can include one or more transducers configured to emit acoustic or other suitable signals that location tag 112 uses to derive a location. Although FIG. 4 depicts only one acoustic transmitting device 104 and location tag 112 it will be appreciated by those skilled in the art that any suitable number of these devices can be included in location system 400.

It is to be appreciated that the Detailed Description section, and not the Summary and Abstract sections, should be used to interpret the claims. The Summary and Abstract sections may set forth one or more but not all exemplary embodiments of the present invention, and thus, should not limit the present invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A real-time location system in an environment, comprising:
    a location tag having a location ID, wherein the location tag is configured to transmit the location ID and a received acoustic ID from an acoustic transmitting device to a central server via a wireless mesh network, the location tag being configured to receive and transmit packets that include information about a local clock of the location tag;
    the wireless mesh network comprising a first mesh network member and a second mesh network member, the first mesh network member and the second mesh network member being battery-powered devices, the first mesh network member having a first clock and the second mesh network member having a second clock, wherein the first mesh network member transmits a first timestamp of the first clock to the second mesh network member, and the second mesh network member generates a message for propagation to the central server, the message including identification of the first mesh network member and the second mesh network member, and the first timestamp and a second timestamp of the second clock;
    the acoustic transmitting device, wherein the acoustic transmitting device is configured to receive and transmit packets that include information about a local clock of the acoustic transmitting device; and
    the central server configured to select a reference clock within the wireless mesh network, further configured to determine a time offset between the first clock and the reference clock based on the message; and further configured to propagate an acoustic transmission schedule to the first mesh network member, wherein the acoustic transmitting device and the location tag communicate acoustically based on the acoustic transmission schedule, the central server transmitting respective clock offset information to the first mesh network member, the second mesh network member, and to the acoustic transmitting device,
    wherein the first mesh network member and the second mesh network member are each provided by the central server a respective schedule, the respective schedule using respective values of the first clock and the second clock, and
    wherein the acoustic transmitting device receives the acoustic transmission schedule from the central server via the first mesh network member or the second mesh network member, the acoustic transmission schedule being set by the reference clock, the acoustic transmission schedule being based on the local clock for the acoustic transmitting device, the acoustic transmission schedule having an offset with respect to the acoustic transmitting device,
    thereby synchronizing, by the central server, members of the wireless mesh network, the acoustic transmission device and the location tag based on relative time pairings and the reference clock.

2. The real-time location system of claim 1, wherein the time offset is determined using statistical analysis.

3. The real-time location system of claim 1, wherein the time offset is determined using linear regression analysis with outlier rejection.

4. The real-time location system of claim 1, wherein the central server is further configured to update the acoustic transmission schedule.

5. The real-time location system of claim 1, wherein the central server is further configured to select a replacement reference clock.

6. The real-time location system of claim 1, wherein the wireless mesh network uses a Zigbee protocol.

7. The real-time location system of claim 1, wherein the wireless mesh network communicates within a radio frequency range of 2.4 to 2.5 GHz, or within a 433 MHz, 868 MHz or 915 MHz ISM band.

8. The real-time location system of claim 1, wherein the location tag receives a firmware upgrade via the wireless mesh network.

9. The real-time location system of claim 1, wherein the wireless mesh network facilitates propagation of the acoustic transmission schedule via intermediate connections based on wireless signal strength.

10. The real-time location system of claim 1, wherein the reference clock is a part of the central server.

11. A method for utilizing a wireless mesh network, comprising:
    receiving, by a location tag, an acoustic ID from an acoustic transmitting device, the location tag being configured to receive and transmit packets that include information about a local clock of the location tag and the acoustic transmitting device being configured to receive and transmit packets that include information about a local clock of the acoustic transmitting device;
    transmitting, by the location tag having a location ID, the location ID and the received acoustic ID to a central server via the wireless mesh network, the wireless mesh network comprising a first mesh network member and a second mesh network member, the first mesh network member and the second mesh network member being battery-powered devices, the first mesh network member having a first clock and the second mesh network member having a second clock;
    transmitting by the first mesh network member a first timestamp of the first clock to the second mesh network member;

generating a message by the second mesh network member for propagation to the central server, the message including identification of the first mesh network member and the second mesh network member, and the first timestamp and a second timestamp of the second clock;

determining by the central server a reference clock within the wireless mesh network, and determining a time offset between the first clock and the reference clock based on the message; and propagating an acoustic transmission schedule to the first mesh network member, wherein the central server transmits respective clock offset information to the first mesh network member, the second mesh network member, and to the acoustic transmitting device, wherein the first mesh network member and the second mesh network member are each provided by the central server a respective schedule, the respective schedule using respective values of the first clock and the second clock, wherein the acoustic transmitting device receives the acoustic transmission schedule from the central server via the first mesh network member or the second mesh network member, the acoustic transmission schedule being set by the reference clock, the acoustic transmission schedule being based on the local clock for the acoustic transmitting device, the acoustic transmission schedule having an offset with respect to the acoustic transmitting device, and wherein the acoustic transmitting device and the location tag communicate acoustically based on the acoustic transmission schedule, thereby synchronizing, by the central server, members of the wireless mesh network, the acoustic transmission device and the location tag based on relative time pairings and the reference clock.

12. The method of claim 11, wherein the determining uses statistical analysis.

13. The method of claim 11, wherein the determining uses linear regression analysis with outlier rejection.

14. The method of claim 11, further comprising:
updating the acoustic transmission schedule.

15. The method of claim 11, further comprising:
selecting a replacement reference clock.

16. The method of claim 11, wherein the wireless mesh network uses a Zigbee protocol.

17. The method of claim 11, wherein the wireless mesh network communicates within a radio frequency range of 2.4 to 2.5 GHz, or within a 433 MHz, 868 MHz or 915 MHz ISM band.

18. The method of claim 11, further comprising:
receiving, by the location tag, a firmware upgrade via the wireless mesh network.

19. The method of claim 11, wherein the propagating the acoustic transmission schedule to the first mesh network member includes:
propagating the acoustic transmission schedule via intermediate connections based on wireless signal strength.

20. The method of claim 11, wherein the reference clock is a part of the central server.

* * * * *